US008432790B2

(12) United States Patent  
Suwala et al.

(10) Patent No.: US 8,432,790 B2
(45) Date of Patent: *Apr. 30, 2013

(54) HIERARCHICAL PROTECTION SWITCHING FRAMEWORK

(75) Inventors: George Suwala, San Jose, CA (US); David Delano Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 251 days.

This patent is subject to a terminal disclaimer.

(21) Appl. No.: 13/035,999

(22) Filed: Feb. 27, 2011

(65) Prior Publication Data
US 2011/0141880 A1 Jun. 16, 2011

Related U.S. Application Data

(63) Continuation of application No. 10/790,946, filed on Mar. 2, 2004, now Pat. No. 7,940,648.

(51) Int. Cl.
*G06F 11/07* (2006.01)
(52) U.S. Cl.
USPC .......................................... 370/218; 370/225
(58) Field of Classification Search .......... 370/216–218, 370/221–222, 225–228, 229–230.1, 235
See application file for complete search history.

(56) References Cited

U.S. PATENT DOCUMENTS

| | | |
|---|---|---|
| 4,701,756 A | 10/1987 | Burr |
| 5,408,462 A | 4/1995 | Opoczynski |
| 5,471,460 A | 11/1995 | Tanabe |
| 5,663,949 A | 9/1997 | Ishibashi et al. |
| 6,023,452 A | 2/2000 | Shiragaki |
| 6,144,633 A | 11/2000 | Ikeda et al. |
| 6,269,452 B1 | 7/2001 | Daruwalla et al. |
| 6,359,857 B1 | 3/2002 | Ahmad et al. |
| 6,430,150 B1 | 8/2002 | Azuma et al. |
| 6,430,700 B1 | 8/2002 | Daruwalla et al. |
| 6,615,362 B1 | 9/2003 | Daruwalla et al. |
| 6,665,262 B1 | 12/2003 | Lindskog et al. |
| 6,694,455 B1 | 2/2004 | Scrandis et al. |
| 6,728,205 B1 | 4/2004 | Finn et al. |

(Continued)

OTHER PUBLICATIONS

Definition of apparatus, 2009, Compact Oxford English Dictionary, Oxford University Press. http://www.askoxford.com/concise.sub.--oed/apparatus.

(Continued)

*Primary Examiner* — Hoon J Chung
*Assistant Examiner* — Curtis A Alia
(74) *Attorney, Agent, or Firm* — The Law Office of Kirk D. Williams

(57) ABSTRACT

A hierarchical protection switching framework uses detectors and protectors. A protector registers with a detector to receive notifications. A detector identifies a condition and the interested protector, and notifies the interested protector. The protector in response to the notification, typically either performs protection switching or notifies another protector of the condition. This protection switching is an extensible operation, and typically may include, but is not limited to switching traffic to a backup facility from a facility corresponding to the condition and switching traffic to a backup component from a component corresponding to the condition. The decision of a protector whether to notify another protector of the condition can be made based on different factors, such as, but not limited to a failure of the protection switching by the protector, a database lookup operation to identify whether notification of another particular condition has been received or not received, etc.

23 Claims, 12 Drawing Sheets

U.S. PATENT DOCUMENTS

| | | |
|---|---|---|
| 6,754,172 B1 | 6/2004 | Tanaka et al. |
| 6,820,210 B1 | 11/2004 | Daruwalla et al. |
| 6,868,057 B1 | 3/2005 | Sha |
| 6,879,559 B1 | 4/2005 | Blackmon et al. |
| 6,973,034 B1 | 12/2005 | Natarajan et al. |
| 6,975,587 B1 | 12/2005 | Adamski et al. |
| 7,013,084 B2 | 3/2006 | Battou et al. |
| 7,428,209 B1 | 9/2008 | Roberts |
| 2002/0054572 A1 | 5/2002 | Saleh et al. |
| 2002/0133756 A1 | 9/2002 | Jain |
| 2003/0058804 A1 | 3/2003 | Saleh et al. |
| 2003/0161304 A1 | 8/2003 | deBoer et al. |
| 2004/0085895 A1 | 5/2004 | Zettinger et al. |

OTHER PUBLICATIONS

W. Lai, Ed. et al., Network Hierarchy and Multilayer Survivability, RFC 3386, IETF, Nov. 2002.

D. Tsiang et al., The Cisco SRP MAC Layer Protocol, RFS 2892, IETF, Aug. 2000.

**DETECTOR:
REGISTRATION OF
CONDITION / PROTECTOR

**DETECTOR:
NOTIFICATION OF
PROTECTOR OF THE CONDITION

**PROTECTOR:
REGISTRATION FOR NOTIFICATION
OF A CONDITION

**PROTECTOR:
REGISTRATION OF
CONDITION / PROTECTOR

PROTECTOR:
RECEIVE NOTIFICATION OF
CONDITION AND PERFORM
PROTECTION SWITCHING

**PROTECTOR:
RECEIVE NOTIFICATION OF
CONDITION AND PERFORM
PROTECTION SWITCHING

HIERARCHICAL PROTECTION SWITCHING FRAMEWORK

CROSS-REFERENCE TO RELATED APPLICATIONS

This is a continuation of copending nonprovisional application Ser. No. 10/790,946, filed Mar. 2, 2004, which is hereby incorporated by reference in its entirety.

TECHNICAL FIELD

One embodiment of the invention relates to communications and computer systems, especially networked routers, packet switching systems, and other devices; and more particularly, one embodiment relates to protection switching, including, but not limited to a hierarchical protection switching framework.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

As IP networks become mission critical infrastructure, network High Availability (HA) grows in importance. Meanwhile, SONET/SDH resilience with sub-50 ms protection switch times has become industry standard, setting the benchmark for other network resilience techniques. While the importance of this exact value of protection switch time can be argued in IP networks due to the re-transmission and resilience properties of TCP and other higher-level protocols, it is clearly beneficial to limit the traffic loss. The benefits are most obvious for real-time applications like Voice over IP where multi-second losses caused by network convergence directly affect end users.

Internet traffic continues to grow faster than Moore's law allows the underlying technology to increase in speed. As a result, the number of links connecting routers is increasing. The trend is toward larger routers with more interconnects. Quite often multiple links connect two adjacent routers, resulting in the emergence of link aggregation techniques. Aggregated links can be configured as a single interface from IP routing perspective, making a single Layer 2 (L2) link failure appear to Layer 3 (L3) as only a reduction in bandwidth. At the same time legacy SONET/SDH networks continue to be used and deployed. As a result routers are being interconnected across SONET/SDH networks using Automatic Protection Switching (APS). SONET-derived ring resiliency principles are also being applied to rings of routers in Resilient Packet Rings (RPR) solutions. Another important networking trend is the wide deployment of Multiprotocol Label Switching (MPLS), which adds a number of new capabilities to IP Networks, with associated protection switching capabilities of connection-oriented MPLS Traffic Engineering (TE) and MPLS Fast Re-Route (FRR). With a variety of different networking layers at which protection switching could be performed in response to a detected condition and the unlimited number of possible network and equipment configurations, desired is a mechanism to provide protection switching which may include coordinating among multiple protection switching mechanisms the actual protection switching performed in response to a particular failure.

SUMMARY

Disclosed are, inter alia, methods, apparatus, data structures, computer-readable medium, mechanisms, and means for performing protection switching. As used herein, protection switching is an extensible resilience mechanism where the path for the protected traffic is known prior to a failure, and typically may include, but is not limited to switching traffic to a backup facility from a facility corresponding to the condition and switching traffic to a backup component from a component corresponding to the condition. Protection switching examples include SONET APS, Bundled Interfaces Protection (BIP), RPR protection and MPLS TE FRR. This is in contrast to a restoration mechanism, where the path for the protected traffic is established (and often discovered) after the failure (for example through OSPF or IS-IS convergence). By definition, protection is faster than restoration because the protection path can be assigned and/or pre-programmed prior to a failure.

One embodiment includes a detector and a first protector. The first protector is configured to perform protection switching in response to one or more notifications of a condition received from the detector, and to register with the detector to be notified of the condition. The detector is configured to receive one or more registration requests from the first protector, and to notify the first protector of the condition upon detection of the condition.

In one embodiment, said protection switching includes switching the physical path of traffic from a working facility to a backup facility while maintaining an UP state indication of a single logical interface including the working facility and the backup facility such that higher-level routing information does not change in response to said switching the physical path.

One embodiment also includes a second protector, with the second protector being configured to perform protection switching in response to one or more notifications received from the first protector, and to register with the first protector to be notified of a particular condition. The first protector is configured to receive one or more registration requests from the second protector, to notify the second protector upon notification of the particular condition, and to register with the detector to be notified of the particular condition. The detector is configured to identify the particular condition, and to notify the first protector of the particular condition upon detection of the particular condition.

One embodiment includes a second protector, with the second protector being configured to perform protection switching in response to one or more notifications received from the first protector, and to register with the first protector to be notified of a particular condition. The first protector is configured to receive one or more registration requests from the second protector, to notify the second protector upon notification of the particular condition if previously notified of another particular condition else not to notify the second protector of the particular condition, and to register with the detector to be notified of the particular condition. The detector is configured to identify the particular condition, and to notify the first protector of the particular condition upon detection of the particular condition.

One embodiment also includes a second protector, with the second protector being configured to perform protection switching in response to one or more notifications received from the first protector, and to register with the first protector to be notified of a particular condition. The first protector is configured to receive one or more registration requests from the second protector, to notify the second protector upon notification of the particular condition if not previously notified of another particular condition else not to notify the second protector of the particular condition, and to register with the detector to be notified of the particular condition. The detector is configured to identify the particular condition, and to notify the first protector of the particular condition upon detection of the particular condition.

One embodiment also includes a second protector, with the second protector being configured to perform protection switching in response to one or more notifications received from the first protector and the detector, to register with the first protector to be notified of a particular condition, and to register with the detector to be notified of a second particular condition. The first protector is configured to send a notification of the particular condition to the second protector in response to the notification of the particular condition by the detector, and register with the detector to be notified of the particular condition. The detector is configured to receive one or more registration requests from the second protector, to notify the first protector upon detection of the particular condition, and to notify the second protector upon detection of the second particular condition.

One embodiment also includes a second protector, with the second protector being configured to perform protection switching in response to one or more notifications received from the first protector, and to register with the first protector to be notified of a particular condition. The first protector is configured to receive one or more registration requests from the second protector, and to register with the detector to be notified of the particular condition. The detector is configured to identify the particular condition, and to notify the first protector of the particular condition upon detection of the particular condition. The first protector is further configured to attempt to protection switch upon notification of the particular condition, and in response to said attempted protection switch failing, notifying the second protector of the particular condition, else not notifying the second protector of the particular condition.

One embodiment includes a second protector and a third protector. The second protector is configured to perform protection switching in response to one or more notifications received from the first protector, and to register with the first protector to be notified of the condition. The first protector is configured to receive one or more registration requests from the second protector, and to determine whether or not to cause a protection switch or to notify the second protector of the condition. The third protector is configured to perform protection switching in response to one or more notifications received from the second protector, and to register with the second protector to be notified of the condition. The second protector is configured to receive one or more registration requests from the third protector, and to determine whether or not to cause a protection switch or to notify the third protector of the condition.

One embodiment includes a detector, a first protector and a second protector. The detector configured to detect a particular condition and to notify a first protector of the particular condition. The first protector configured to receive an indication of the particular condition from the detector, and to identifying whether or not to (a) perform protection switching itself based on the particular condition or (b) to notify a second protector of the particular condition for the second protector to perform protection switching. The second protector configured to receive a notification of the particular condition from the first protector, and in response to perform protection switching based on the particular condition.

In one embodiment, the operation of identifying whether or not to (a) perform protection switching itself based on the particular condition or (b) to notify a second protector of the particular condition includes attempting by the first protector to protection switch, and in response to failure of said protection switch or due to any other in-ability to protect, to notify the second protector of the particular condition.

In one embodiment, the operation of identifying whether or not to (a) perform protection switching itself based on the particular condition or (b) to notify a second protector of the particular condition includes referencing a data structure to identify whether or not a second particular condition has been previously identified by a detector.

In one embodiment, the detector is further configured to detect a second particular condition and to notify the second protector of the second particular condition. In one embodiment, the second protector is configured to receive an indication of the second particular condition from the detector, and to identifying whether or not to (a) perform protection switching itself based on the second particular condition or (b) to notify a third protector of the second particular condition for the third protector to perform protection switching.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1A:
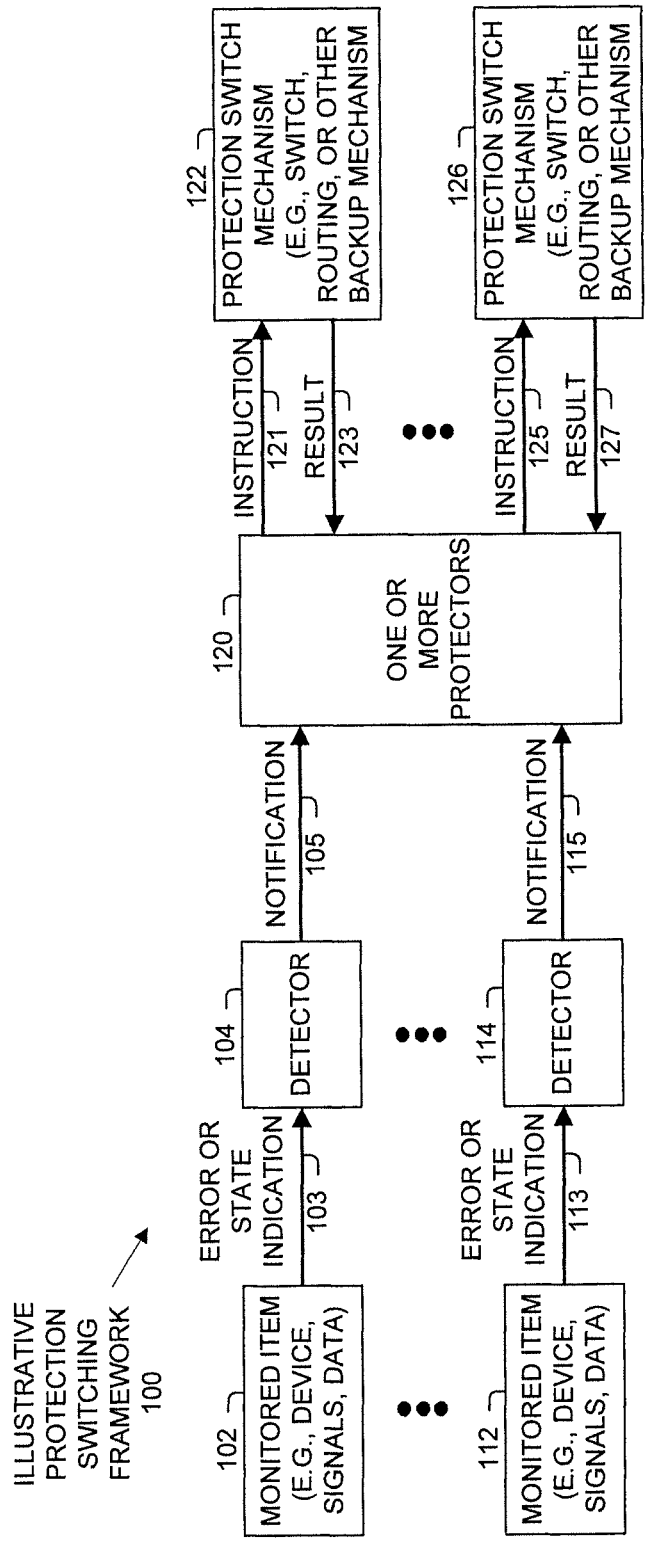
FIG. 1A is a block diagram illustrating a protection switching framework used in one embodiment.

Disclosed are, inter alia, methods, apparatus, data structures, computer-readable medium, mechanisms, and means for protection switching, including, but not limited to a hierarchical protection switching framework Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc. The term "associative memory" is an extensible term, and refers to all types of known or future developed associative memories, including, but not limited to binary and ternary content addressable memories, hash tables, TRIE and other data structures, etc. Additionally, the term "associative memory unit" may include, but is not limited to one or more associative memory devices or parts thereof, including, but not limited to regions, segments, banks, pages, blocks, sets of entries, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items.

Disclosed are, inter alia, methods, apparatus, data structures, computer-readable medium, mechanisms, and means for performing protection switching. As used herein, protection switching is an extensible resilience mechanism where the path for the protected traffic is known prior to a failure, and typically may include, but is not limited to switching traffic to a backup facility from a facility corresponding to the condition and switching traffic to a backup component from a component corresponding to the condition. Protection switching examples include SONET APS, Bundled Interfaces Protection (BIP), RPR protection and MPLS TE FRR. This is in contrast to a restoration mechanism, where the path for the protected traffic is established (and often discovered) after the failure (for example through OSPF or IS-IS convergence). By definition, protection is faster than restoration because the protection path can be assigned and/or pre-programmed prior to a failure.

One embodiment includes a detector and a first protector. The first protector is configured to perform protection switching in response to one or more notifications of a condition received from the detector, and to register with the detector to be notified of the condition. The detector is configured to receive one or more registration requests from the first protector, and to notify the first protector of the condition upon detection of the condition.

In one embodiment, said protection switching includes switching the physical path of traffic from a working facility to a backup facility while maintaining an UP state indication of a single logical interface including the working facility and the backup facility such that higher-level routing information does not change in response to said switching the physical path.

One embodiment also includes a second protector, with the second protector being configured to perform protection switching in response to one or more notifications received from the first protector, and to register with the first protector to be notified of a particular condition. The first protector is configured to receive one or more registration requests from the second protector, to notify the second protector upon notification of the particular condition, and to register with the detector to be notified of the particular condition. The detector is configured to identify the particular condition, and to notify the first protector of the particular condition upon detection of the particular condition.

One embodiment includes a second protector, with the second protector being configured to perform protection switching in response to one or more notifications received from the first protector, and to register with the first protector to be notified of a particular condition. The first protector is configured to receive one or more registration requests from the second protector, to notify the second protector upon notification of the particular condition if previously notified of another particular condition else not to notify the second protector of the particular condition, and to register with the detector to be notified of the particular condition. The detector is configured to identify the particular condition, and to notify the first protector of the particular condition upon detection of the particular condition.

One embodiment also includes a second protector, with the second protector being configured to perform protection switching in response to one or more notifications received from the first protector, and to register with the first protector to be notified of a particular condition. The first protector is configured to receive one or more registration requests from the second protector, to notify the second protector upon notification of the particular condition if not previously notified of another particular condition else not to notify the second protector of the particular condition, and to register with the detector to be notified of the particular condition. The detector is configured to identify the particular condition, and to notify the first protector of the particular condition upon detection of the particular condition.

One embodiment also includes a second protector, with the second protector being configured to perform protection switching in response to one or more notifications received from the first protector and the detector, to register with the first protector to be notified of a particular condition, and to register with the detector to be notified of a second particular condition. The first protector is configured to send a notification of the particular condition to the second protector in response to the notification of the particular condition by the detector, and register with the detector to be notified of the particular condition. The detector is configured to receive one or more registration requests from the second protector, to notify the first protector upon detection of the particular condition, and to notify the second protector upon detection of the second particular condition.

One embodiment also includes a second protector, with the second protector being configured to perform protection switching in response to one or more notifications received from the first protector, and to register with the first protector to be notified of a particular condition. The first protector is configured to receive one or more registration requests from the second protector, and to register with the detector to be notified of the particular condition. The detector is configured to identify the particular condition, and to notify the first protector of the particular condition upon detection of the particular condition. The first protector is further configured to attempt to protection switch upon notification of the particular condition, and in response to said attempted protection switch failing, notifying the second protector of the particular condition, else not notifying the second protector of the particular condition.

One embodiment includes a second protector and a third protector. The second protector is configured to perform protection switching in response to one or more notifications received from the first protector, and to register with the first protector to be notified of the condition. The first protector is configured to receive one or more registration requests from the second protector, and to determine whether or not to cause a protection switch or to notify the second protector of the condition. The third protector is configured to perform protection switching in response to one or more notifications received from the second protector, and to register with the second protector to be notified of the condition. The second protector is configured to receive one or more registration requests from the third protector, and to determine whether or not to cause a protection switch or to notify the third protector of the condition.

One embodiment includes a detector, a first protector and a second protector. The detector configured to detect a particular condition and to notify a first protector of the particular condition. The first protector configured to receive an indication of the particular condition from the detector, and to identifying whether or not to (a) perform protection switching itself based on the particular condition or (b) to notify a second protector of the particular condition for the second protector to perform protection switching. The second protector configured to receive a notification of the particular condition from the first protector, and in response to perform protection switching based on the particular condition.

In one embodiment, the operation of identifying whether or not to (a) perform protection switching itself based on the particular condition or (b) to notify a second protector of the particular condition includes attempting by the first protector to protection switch, and in response to failure of said protection switch or due to any other in-ability to protect, to notify the second protector of the particular condition.

In one embodiment, the operation of identifying whether or not to (a) perform protection switching itself based on the particular condition or (b) to notify a second protector of the particular condition includes referencing a data structure to identify whether or not a second particular condition has been previously identified by a detector.

In one embodiment, the detector is further configured to detect a second particular condition and to notify the second protector of the second particular condition. In one embodiment, the second protector is configured to receive an indication of the second particular condition from the detector, and to identifying whether or not to (a) perform protection switching itself based on the second particular condition or (b) to notify a third protector of the second particular condition for the third protector to perform protection switching.

Protection switching can be triggered by a detector automatically due to a defect in network facilities or local equipment failures or in response to an operator request. This triggering can be immediate or delayed, and based on a single or multiple events, such as those exceeding a predetermined time duration threshold or quantity threshold. Detection of network conditions (e.g., failures, degraded performance, errors, particular state information, etc.) and equipment failures are well-know in the art and thus will not be repeated here, with the particulars often depending on the equipment employed, the network configuration, the vendor's implementation, and user configuration. Examples of such detected conditions include, but are not limited equipment failures or degradation (e.g., a burned out laser, failed node or component thereof, packets dropped, traffic conditions, security violations, etc.), and facility failures or degradation (e.g., Loss of Signal, Excessive Bit Error Rate, etc.).

A protective switching framework 100 used in one embodiment is illustrated in FIG. 1A. Protective switching framework 100 illustrates, inter alia, that a protector can receive notifications from one or more detectors and protection switch using one or more protection switching mechanisms.

As shown, monitored items (e.g., a device, received signals, data, etc.) 102 and 112 provide error or state indications 103 and 113 to detectors 104 and 114, respectively. Depending on the particular condition detected, detector 104 notifies (105) one or more protectors 120 (e.g., a single protector or multiple protectors interconnected using the protection switching framework) via some communication mechanism of a detected condition. Similarly, detector 114 notifies (115) one or more protectors 120 via some communication mechanism of a detected condition. Note, notification can be provided directly or indirectly via a communication distribution mechanism. Then, one or more protectors 120, depending on the particular condition, may initiate protection switching by providing an instruction 121, 125 (e.g., a message, data, signal, instruction in a procedure, etc.) to protection switch mechanism 122 and/or 126 to perform the protection switching (e.g., cut-over to the new device, facility, routing entry, etc.). In response, typically, although not required, a result indication 123, 127 is received from the protection switch mechanism 122 and/or 126 instructed to perform the protection switching to indicate whether or not the instructed protection switching is successful. For example, in one embodiment, one or more protectors 120 instruct (121) protection switch mechanism 122 to perform protection switching, and in response to result 123 indicating a failure, then one or more protectors 120 instruct (125) protection switch mechanism 126 to perform protection switching. Note, the different blocks illustrated in FIG. 1A are different elements/mechanisms in one embodiment, while the functionality of some or all blocks are combined into one or more elements/mechanisms in one embodiment.

Figure 1B:
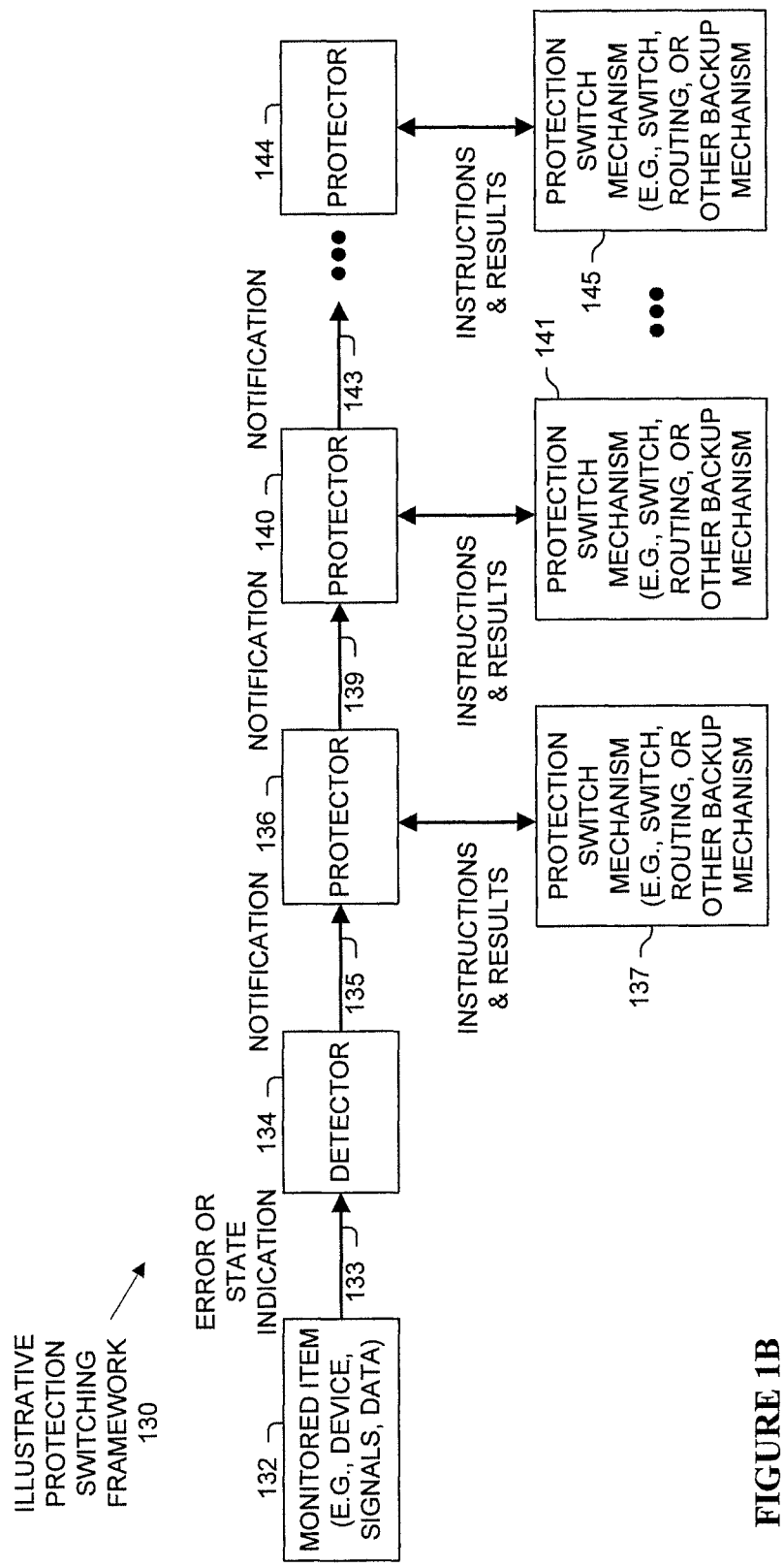
FIG. 1B is a block diagram illustrating a protection switching framework used in one embodiment.

A protective switching framework 130 used in one embodiment is illustrated in FIG. 1B. Protective switching framework 130 illustrates, inter alia, that a protector can become a detector for another protector.

As shown, monitored item 132 provide error or state indication 133 to detector 134. Depending on the particular condition detected, detector 134 notifies (135) via some communication mechanism protector 136. Depending on the identified particular condition, protector 136, for example, instructs protection switch mechanism 137 to protection switch, notifies (139) protector 140 of a condition (e.g., the notified condition 135, or another condition based on notified condition 135 and another notification or data structure lookup result, etc.) immediately or in response to a successful or failed protection switching operation, and/or performs some other processing with or without providing notification 139. Similarly, based on notification 139, protector 140 instructs protection switch mechanism 141 to protection switch, notifies (143) a next protector (e.g., protector 144 to possibly instruct protection switch mechanism 145) and/or performs some other processing with or without providing notification 143; and so on. The number of detectors, protectors, and protection switching mechanisms and their interconnections are of course configurable to meet the needs of the specific application.

Figure 1C:
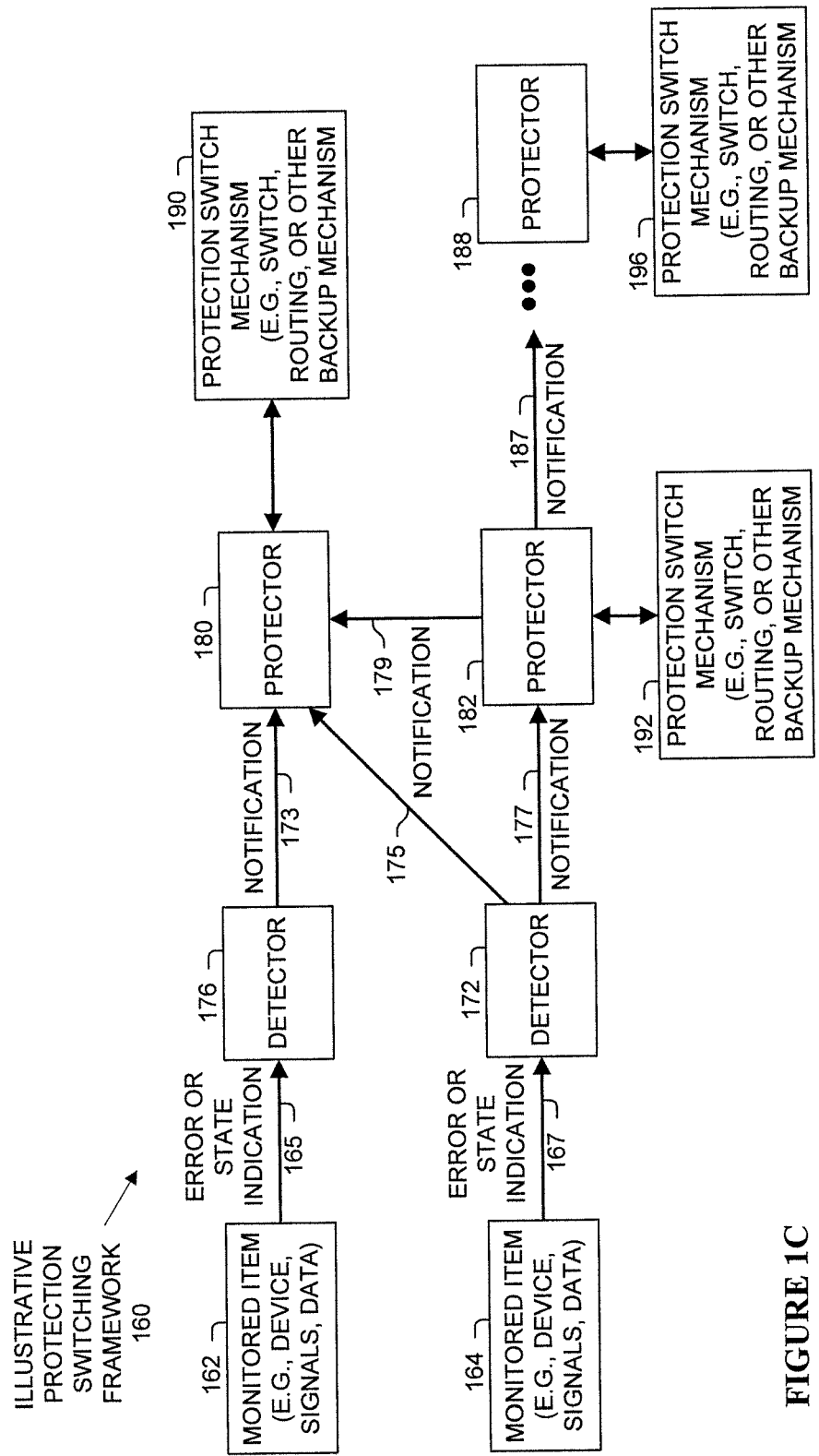
FIG. 1C is a block diagram illustrating a protection switching framework used in one embodiment.

A protective switching framework 160 used in one embodiment is illustrated in FIG. 1C, which illustrates another possible configuration of the extensible, and unlimited number of configurations and applications thereof.

As shown, monitored items (e.g., a device, received signals, data, etc.) 162 and 164 provide error or state indications 165 and 167 to detectors 176 and 172, respectively, which possibly provide notification (173, 175, 177) to protectors 180 and/or 182. In response to a received notification 173, 175 and/or 179, protector 180 can cause protection switch mechanism 190 to protection switch. In response to a received notification 177, protector 182 can cause protection switch mechanism 192 to protection switch, provide notification 179 to protector 180, and/or provide notification 187 to another protector, such as protector 188 which controls protection switch mechanism 196. Note, the operation of protector 182 can be immediate, delayed (e.g., to wait for a status response from protection switch mechanism 192), and be based on one or more received notifications and/or other state information, such as that typically maintained in a data structure/memory accessible to protector 182.

For example, in one embodiment, framework 160 is used to protection switch a SONET link on which there is a MPLS tunnel protected through MPLS Fast Re-Route (FRR). The link is monitored (164) by SONET detector 172. The tunnel's integrity is also monitored through hello messages (162) and detector 176. The SONET link is made a member of a SONET APS group, being protect by APS Protector 182. So, the tunnel is protected in two ways: (a) by protector 180 running FRR or another algorithm to cause protection switch mechanism 190 to switch the tunnel to another pre-programmed tunnel; and (b) by protector 182 to cause protection switch mechanism 192 (or another protector/protection switch) to switch the fiber with the tunnel to another fiber (which would switch transparently to the MPLS protocol layer and protector 180). Note, there may be other tunnels/logical links (in addition to MPLS) protected by the APS, and other links placed on top of those links, etc. These could be protected, for example, by a series of one or more protectors after protector 182. Of course, the appropriate detectors and protectors would need to be registered with in order to cause the proper sequence of notifications and processing of notifications. In this manner, a hierarchy of protection switching is provided, which, for example, can be programmed to appropriately protection switch at various protocol layers and/or in response to a failure of a lower-level protection switching mechanism (e.g., if there is no backup fiber currently available for protection switching, then switch the path of the tunnel, etc.).

The protection switching framework used by one embodiment handles component interactions and methodologies required for deciding how and when protection switching should occur. For example and referring to protection switching framework 160, suppose a fiber cut is recognized by detector 172, such as via monitored item 164 and indication 167. Two protectors, 180 and 182, have registered with detector 172 to be notified of this condition. Detector 172 may notify (e.g., send Signal Fail notification message 177) APS protector 182 and not protector 180 based on a priority or hierarchy level. APS protector 182 then can use protection switch 192 to overcome the fiber cut. However, APS protector 182 may determine that it cannot protect using one of its protection switch mechanisms under its control (e.g., there is an operator Lockout command present which blocks all APS switches, or there is no backup fiber available for protection switch 192, etc.). Thus, protector 182 does not protect, but rather immediately sends notification 179 to protector 180, which then processes the received notification 179 based on its configuration and programmed methodology. For example, protector 180 may cause protection switch mechanism 190 to protect.

If the protection switching was not handled in such a manner and after a time duration of the failure, the failure would be identified by a hello time-out and recognized by detector 176, which notifies protector 180, which then can cause protection switch mechanism 190 to protection switch.

Figure 2A:
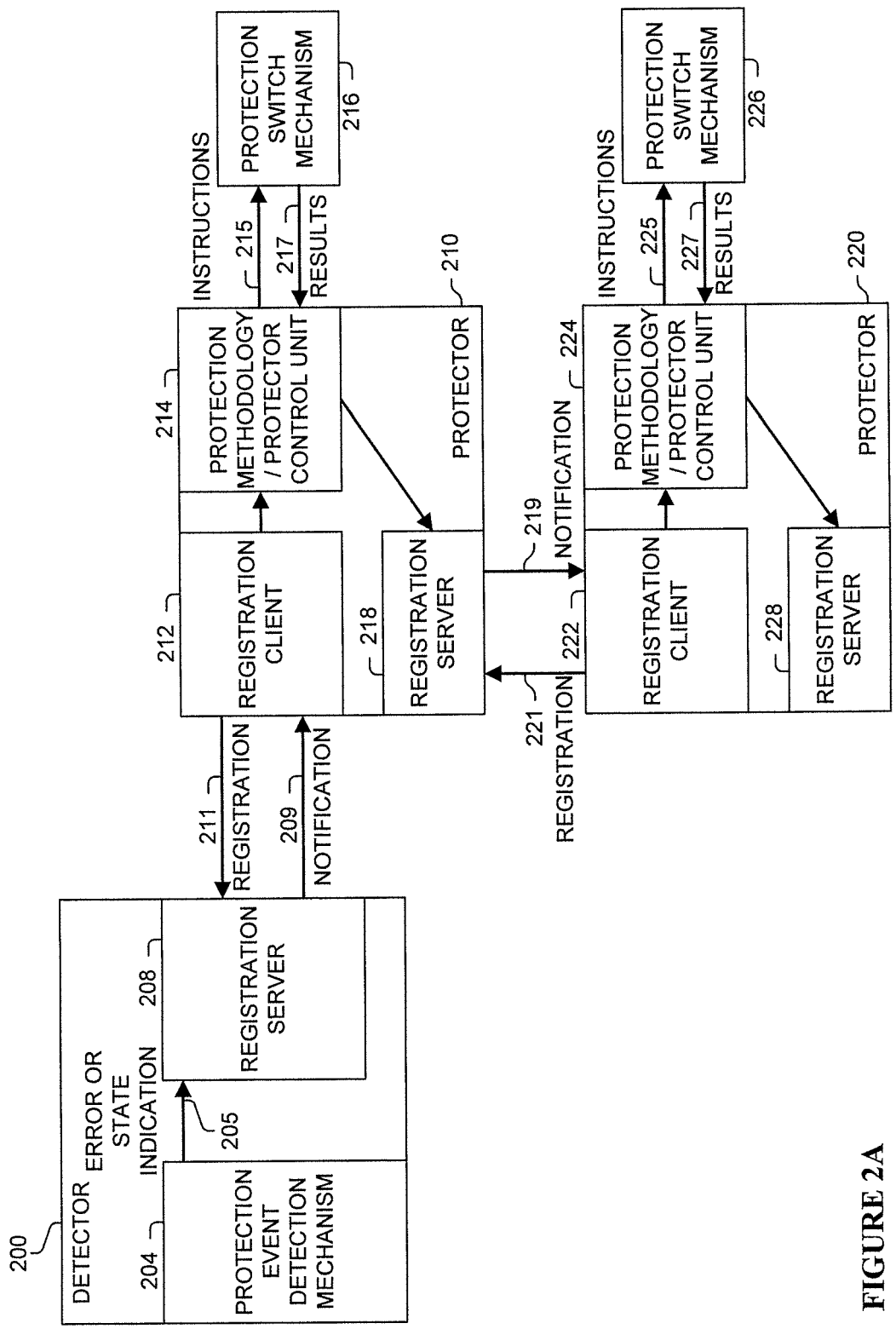
FIG. 2A is a block diagram illustrating a detector and protectors used in one embodiment.

FIG. 2A is a block diagram illustrating a detector 200 and protectors 210 and 220 used in one embodiment. As shown, detector 200 includes a protection event detection mechanism 204 (e.g., a sensor, receiver, logic or processor with memory or data structures, etc.) which detects an event (e.g., a state, change of state, error or degraded condition, etc.) and forwards an indication 205 of such to the registration server 208, which typically includes some memory/data structures for mapping conditions to protectors and possibly events to conditions. The processing by registration server 208 is typically performed based on a fixed or programmed set of rules or user configuration commands.

As shown, protector 210 includes a registration client 212 for registering with a detector or another protector, a registration server 218 for notifying other protectors, and a protection methodology/protector control unit 214 (e.g., a process, control logic, processor, etc.), which controls the protection switching operation of protector 210, and typically includes some memory/data structures for mapping conditions to protectors and possibly for use in performing some other processing based on the notified particular condition. Protection methodology/protector control unit 214 is typically performed based on a fixed or programmed set of rules or user configuration commands. Depending on the condition and processing of the condition, protector 210 typically either performs the protection switching function itself (e.g., provides an instruction 215 to the actual switch mechanism 216 and optionally receives a result 217 indicating a success or failure of the protection switch) and/or notifies another protector (e.g., protection methodology 214 causes registration 218 to notify one or more protectors).

As shown, protector 220 includes a registration client 222 for registering with a detector or another protector, a registration server 228 for notifying other protectors, and a protection methodology/protector control unit 224 (e.g., a process, control logic, processor, etc.), which controls the protection switching operation of protector 220, and typically includes some memory/data structures for mapping conditions to protectors and possibly for use in performing some other processing based on the notified particular condition. Protection methodology/protector control unit 224 is typically performed based on a fixed or programmed set of rules or user configuration commands. Depending on the condition and processing of the condition, protector 220 typically either performs the protection switching function itself (e.g., provides an instruction 225 to the actual switch mechanism 226 and optionally receives a result 227 indicating a success or failure of the protection switch) and/or notifies another protector (e.g., protection methodology 224 causes registration 228 to notify one or more protectors).

Thus, in the configuration shown in FIG. 2A, protector 220 registers (221) to receive notifications (219) with protector 210, which registers (211) with detector 200 to receive notifications (209). The timing of these registration events may vary between embodiments. Also, one embodiment uses a reliable registration process whereby a receiving element (e.g., protector or detector) acknowledges a valid registration request. For example, a registration request may not be valid for a notification of a particular condition to a protector until the protector registers a valid registration request with another protector and/or detector to receive the notifications and/or other information required to process the conditions corresponding to the registration request. Note, as illustrated in FIG. 2A, detector 200 and protectors 210 and 220 provide similar services, and thus, one embodiment can reuse code and/or the same libraries for performing these common functions. Also, these functions can be implemented in an unlimited number of ways, such as, but not limited to being processes of a processor, specialized control logic, part of an ASIC, etc.

Figure 2B:
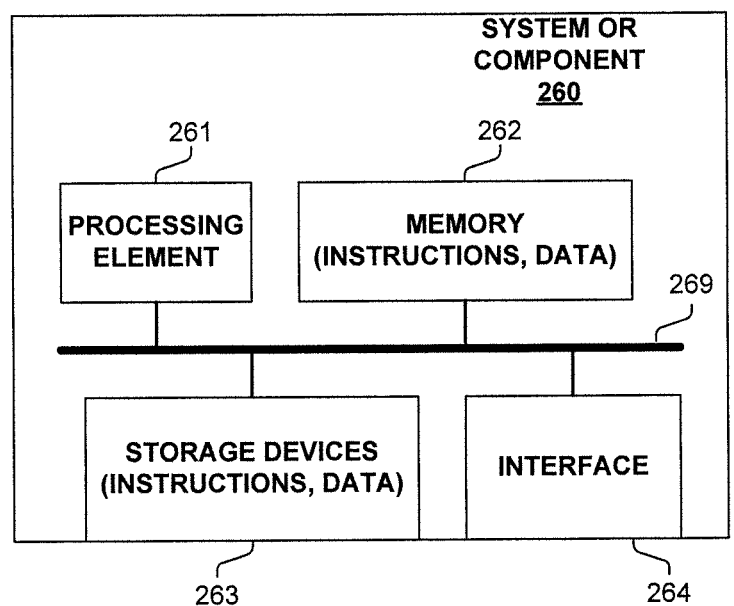
FIG. 2B is a block diagram illustrating a system or component (e.g., a protector detector and/or protection switching mechanism used in one embodiment.

FIG. 2B is a block diagram illustrating a system or component (e.g., a protector detector and/or protection switching mechanism used in one embodiment. In one embodiment, system or component 260 performs one or more processes corresponding to one of the flow diagrams illustrated or otherwise described herein.

In one embodiment, component 260 includes a processing element 261, memory 262, storage devices 263, and an interface 264 for sending and receiving packets, items, and/or other information, which are typically coupled via one or more communications mechanisms 269 (shown as a bus for illustrative purposes.) Various embodiments of component 260 may include more or less elements. The operation of component 260 is typically controlled by processing element 261 using memory 262 and storage devices 263 to perform one or more tasks or processes. Memory 262 is one type of computer-readable medium, and typically comprises random access memory (RAM), read only memory (ROM), flash memory, integrated circuits, and/or other memory components. Memory 262 typically stores computer-executable instructions to be executed by processing element 261 and/or data which is manipulated by processing element 261 for implementing functionality in accordance with an embodiment. Storage devices 263 are another type of computer-readable medium, and typically comprise solid state storage media, disk drives, diskettes, networked services, tape drives, and other storage devices. Storage devices 263 typically store computer-executable instructions to be executed by processing element 261 and/or data which is manipulated by processing element 261 for implementing functionality in accordance with an embodiment.

Figure 3A:
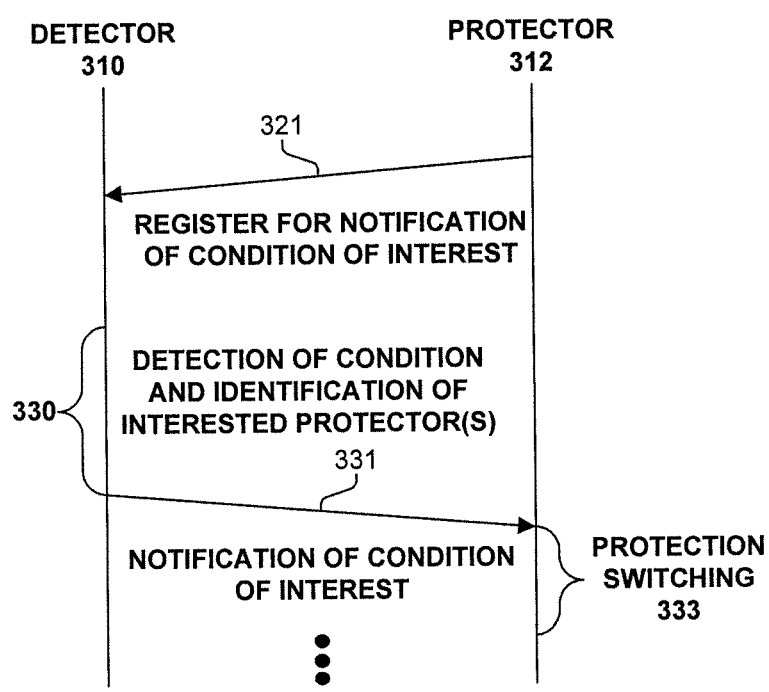
FIG. 3A is a message sequence chart illustrating the operation of a protection switching framework used in one embodiment.

FIG. 3A is a message sequence chart illustrating the operation of a protection switching framework used in one embodiment. In this example, protector 312 registers for notification of a condition of interest 321 with detector 310. In response to the detection of a condition of interest and an identification of the interested protector 330, detector 310 provides notification 331 of the condition to protector 312, which performs the protection switching 333. Note, in one embodiment, detector 310 possibly represents multiple detectors and protector 312 possibly represents multiple protectors.

Figure 3B:
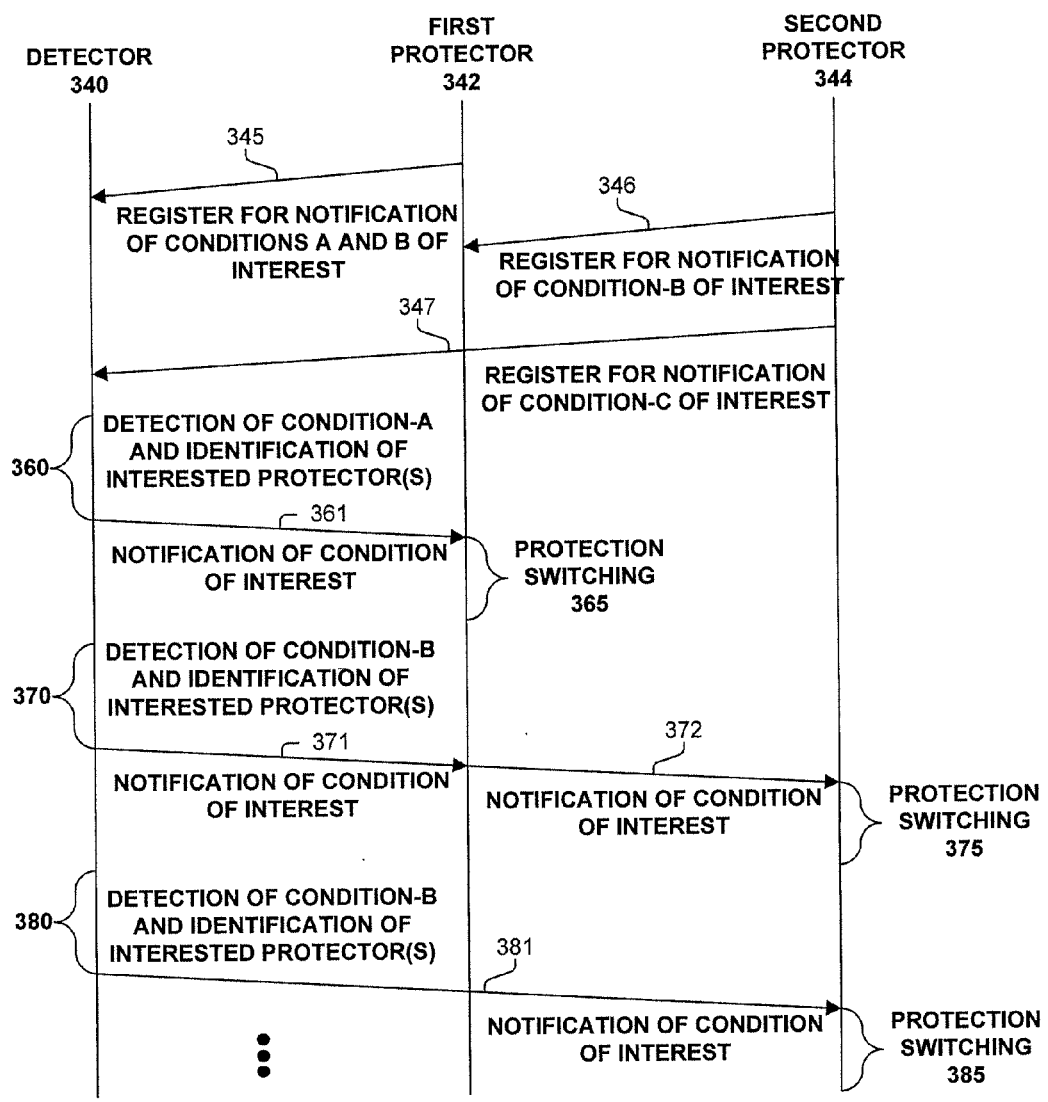
FIG. 3B is a message sequence chart illustrating the operation of a protection switching framework used in one embodiment.

FIG. 3B is a message sequence chart illustrating the operation of a protection switching framework used in one embodiment. As shown, first protector 342 registers 345 with detector 340 for notification of conditions A and B of interest. Second protector 344 registers 346 with first protector 342 for notification of condition-B of interest. Second protector 344 also registers 347 with detector 340 for notification of condition-C of interest.

In response to the detection of condition-A and identification of interested first protector 342 (as indicated by reference number 360), detector 340 notifies (361) first protector 342, which then performs the protection switching 365.

In response to the detection of condition-B and identification of interested first protector 342 (as indicated by reference number 370), detector 340 notifies (371) first protector 342, which determines that second protector 344 is interested in notification of condition-B. First protector 342 notifies (372) second protector 344 of condition-B, and second protector 344 then performs the protection switching 375.

In response to the detection of condition-C and identification of interested second protector 344 (as indicated by reference number 380), detector 340 notifies (381) second protector 344, which then performs the protection switching 385.

Figure 4:
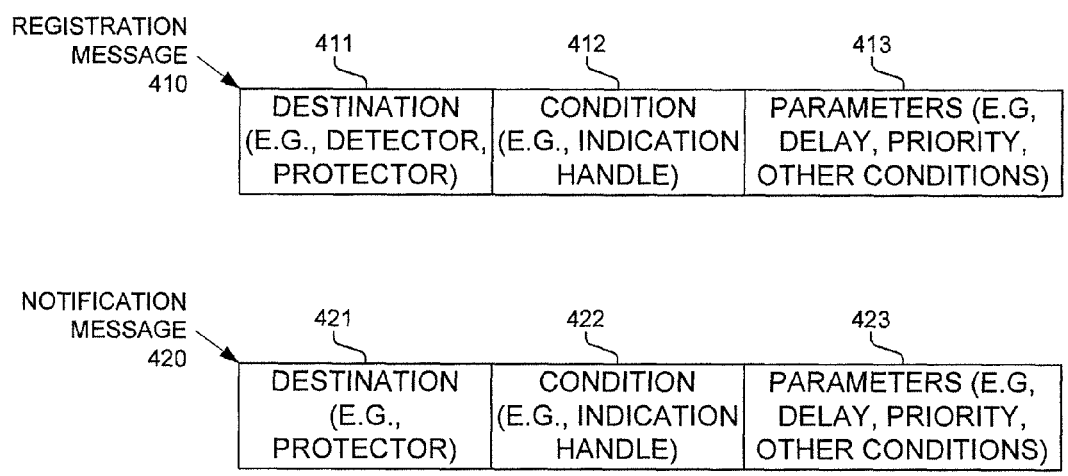
FIG. 4 is a block diagram illustrating various messages used in one embodiment.

FIG. 4 is a block diagram illustrating various messages used in one embodiment. Registration message 410 typically includes one or more fields 411-413: a destination 411 (e.g., detector or protector) of the message if needed, an identification of the condition 412 (e.g., a handle or other unique identification value of a single event, multiple events, a category of events or some other identification of the failed resource, etc.), and parameters 413 (e.g., delay before notification, notification priority, other conditions such as notify on failure, notify if other conditions have or have not occurred, etc.). Notification message 420 typically includes one or more fields 421-423: a destination 421 (e.g., protector) of the message if needed, an identification of the detected condition 422 (e.g., a handle or other unique identification value of a single event, multiple events, a category of events or some other identification of the failed resource, etc.), and parameters 423 (e.g., delay before protection switching, priority, other conditions such as protection switch in different manners if other conditions have or have not occurred, etc.).

Figure 5A:
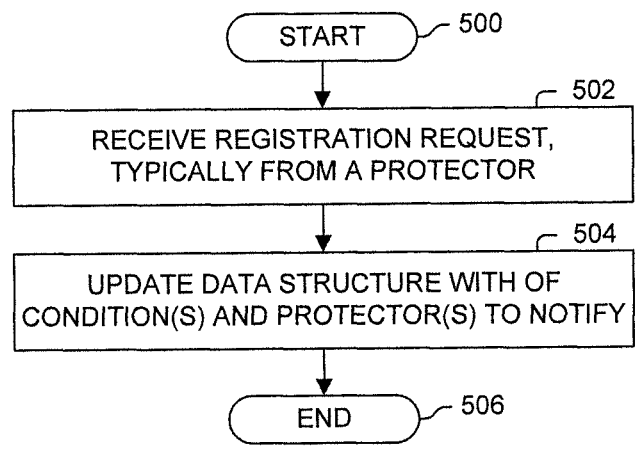
FIGS. 5A-B are flow diagrams illustrating detector processes used in one embodiment.
Figure 5B:
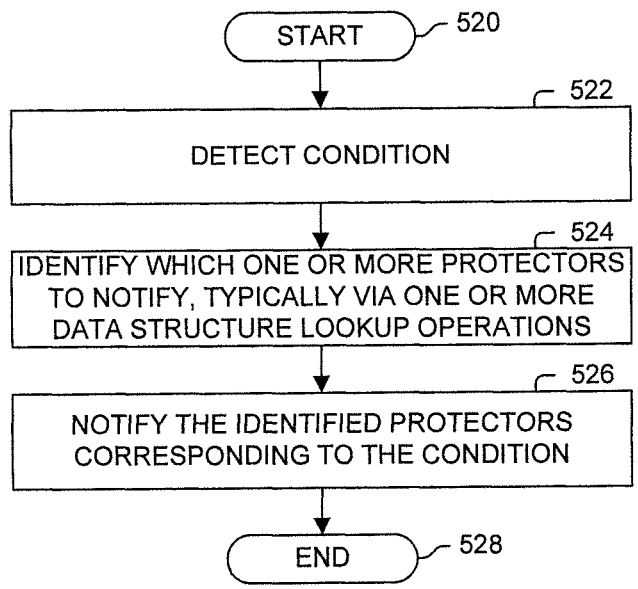

FIGS. 5A-B are flow diagrams illustrating detector processes used in one embodiment. Processing of the flow diagram illustrated in FIG. 5A begins with process block 500, and proceeds to process block 502, wherein a registration request is received, typically from a protector. Next in process block 504, a data structure is updated with the registered condition(s) including parameters and protector(s) to notify upon detection (e.g., detection of an event in conformance with any specified parameters if applicable). In one embodiment, control logic is updated or programmed rather than a data structure for expediency of protection switching. Processing is complete as indicated by process block 506.

Figure 6A:
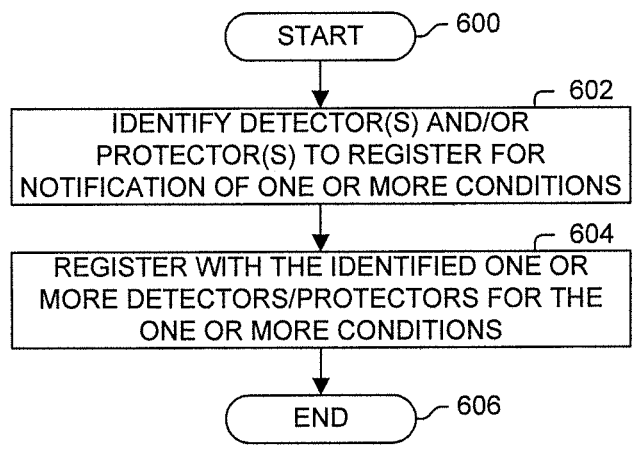
FIGS. 6A-B are flow diagrams illustrating protector processes used in one embodiment.
Figure 6B:
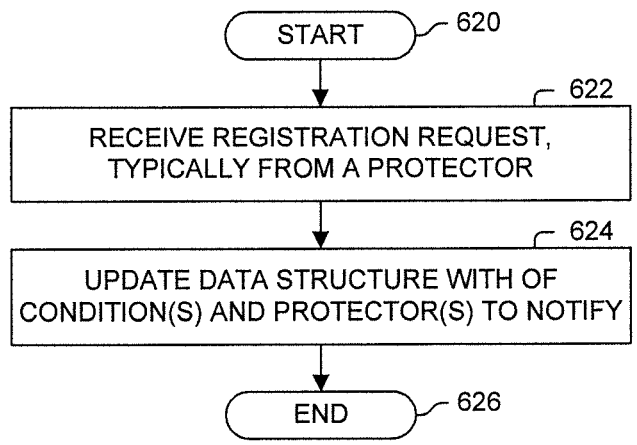

Processing of the flow diagram illustrated in FIG. 5B begins with process block 520, and proceeds to process block 522, wherein a condition is detected. In process block 524, one or more protectors of interest are identified, such as via one or more lookup operations on a data structure. In process block 526, the identified protector(s) are notified of the condition. Processing is complete as indicated by process block 528. FIGS. 6A-B are flow diagrams illustrating protector processes used in one embodiment. Processing of the flow diagram illustrated in FIG. 6A begins with process block 600, and proceeds to process block 602, wherein one or more detectors and/or protectors to register for notification of one or more conditions of interest are identified. Then, in process block 604, the registration for notification of the conditions of interest is performed. Processing is complete as indicated by process block 606.

Processing of the flow diagram illustrated in FIG. 6B begins with process block 620, and proceeds to process block 622, wherein a registration request is received, typically from a protector. Next in process block 624, a data structure is updated with the registered condition(s) including parameters and protector(s) to notify upon receipt and processing of a notification from a detector or protector in conformance with any specified parameters if applicable. In one embodiment, control logic is updated or programmed rather than a data structure for expediency of protection switching. Processing is complete as indicated by process block 626.

Figure 6C:
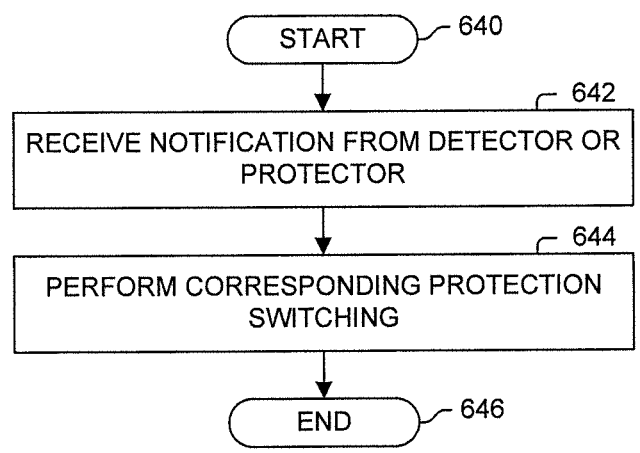
FIG. 6C is a flow diagram illustrating a protector processes used in one embodiment.

FIG. 6C is a flow diagram illustrating a protector processes used in one embodiment. Processing begins with process block 640, and proceeds to process block 642, wherein a notification of a condition is received from a detector or protector. Then, in process block 644, the corresponding protection switching is performed. Processing is complete as indicated by process block 646.

Figure 6D:
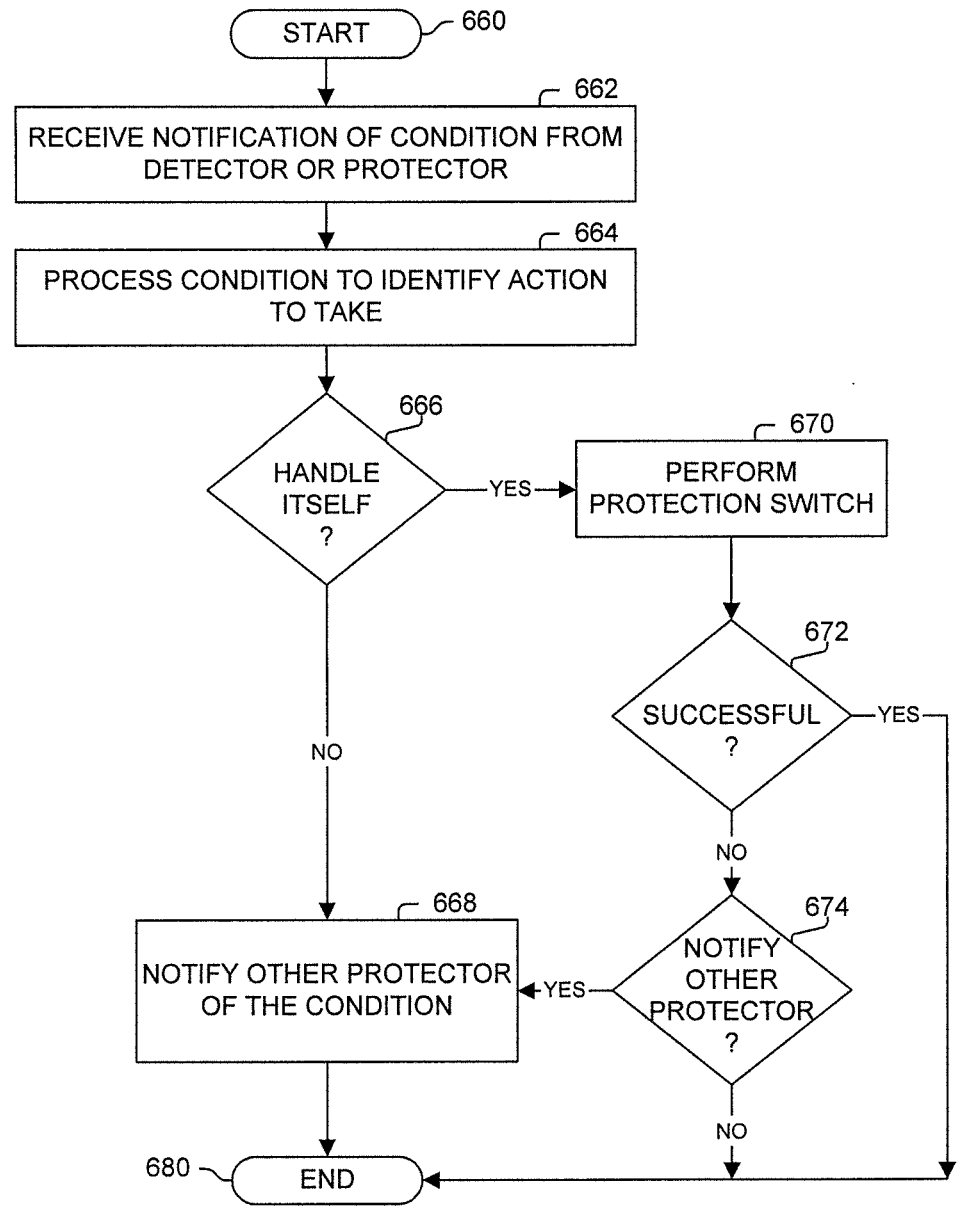
FIG. 6D is a flow diagram illustrating a protector processes used in one embodiment.

FIG. 6D is a flow diagram illustrating a protector processes used in one embodiment. Processing begins with process block 660, and proceeds to process block 662, wherein a notification of a condition is received from a detector or protector. In process block 664, the condition is processed to identify the action to take, which may include, but is not limited to whether to protection switch itself or to notify another protector, to determine how to protection switch such as in response to one or more other conditions previously occurring or not occurring, etc. For example, if the combination of conditions for which notification has or has not been received may allow a distinction to be made as to the actual failure (e.g., a facility failure versus a line card or node failure, etc.).

As determined in process block 666, if the protector is to handle the protection switching itself, then in process block 670, the corresponding protection switching is performed. As determined in process block 672, if such protection switching was successful, then processing is complete as indicated by process block 680. Otherwise, as determined in process block 674, if upon the protection switching failure another protector should be notified or in process block 666 that another protector is to be notified, then in process block 668, another protector is notified of the condition, and processing is complete as indicated by process block 680.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method, comprising:
performing operations by a device;
wherein the device includes: a detector, and a first protector;
wherein said operations include:
receiving, by the detector from the first protector, one or more registration requests to be notified of a particular condition of interest; wherein the particular condition of interest is a network, equipment or facility failure or degradation;
notifying, by the detector, the first protector of the particular condition of interest upon detection of the particular condition of interest and based on said received registration requests; and
protection switching, by the first protector, in response to said notifications of the particular condition of interest received from the detector.

2. The method of claim 1, wherein said protection switching includes switching the physical path of traffic from a working facility to a backup facility while maintaining an UP state indication of a single logical interface including the working facility and the backup facility such that higher-level routing information does not change in response to said switching the physical path.

3. The method of claim 1, wherein said protection switching includes switching traffic to a backup facility from a facility corresponding to the particular condition of interest.

4. The method of claim 1, wherein said protection switching includes switching traffic to a backup component from a component corresponding to the particular condition of interest.

5. The method of claim 1, wherein the device includes a second protector; and
wherein said operations include:
receiving, by the detector from the second protector, one or more registration requests to notify the second protector of the particular condition of interest; and
notifying, by the detector, the second protector of the particular condition of interest upon said detection of the particular condition of interest and based on said received registration requests from the second protector.

6. A method, comprising:
performing operations by a device;
wherein the device includes: a detector, a first protector, and a second protector;
wherein said operations include:
receiving, by the first protector from the second protector, one or more registration requests to be notified of a particular condition of interest; wherein the particular condition of interest is a network, equipment or facility failure or degradation;
receiving, by the detector from the first protector, one or more registration requests to be notified of the particular condition of interest;
notifying, by the detector, the first protector of the particular condition of interest upon identification of the particular condition of interest and based on said received registration requests from the first protector to be notified of the particular condition of interest;
notifying, by the first protector, the second protector of the particular condition of interest in response to receiving said notification from the detector and based on said received registration requests from the first protector to be notified of the particular condition of interest; and
protection switching, by the second protector, in response to said notifications of the particular condition of interest received from the first protector.

7. The method of claim 6, wherein the first protector is configured to communicate to the detector said one or more registration requests in response to said receiving of said registration requests from the first protector.

8. The method of claim 6, wherein a further condition precedent of the first protector performing said operation of notifying the second protector of the particular condition of interest includes: the first protector having been previously notified of a second particular condition of interest; wherein the second particular condition of interest is a network, equipment or facility failure or degradation.

9. The method of claim 6, wherein a further condition precedent of the first protector performing said operation of notifying the second protector of the particular condition of interest includes: the first protector failing in an attempt to protection switch in response to receiving said notification from the detector of the particular condition of interest.

10. A method, comprising:
performing operations by a device;
wherein the device includes: a detector, a first protector, and a second protector;
wherein said operations include:
receiving, by the detector from the first protector, one or more registration requests to be notified of a particular condition of interest; wherein the particular condition of interest is a network, equipment or facility failure or degradation;
receiving, by the first protector from the second protector, one or more registration requests to be notified of the particular condition of interest;
notifying, by the detector, the first protector of the particular condition of interest upon detection of the particular condition of interest and based on said received registration requests; and
determining, by the first protector in response to said notifications of the particular condition of interest received from the detector: to protection switch, or to notify the second protector to protection switch.

11. The method of claim 10, wherein said operations include: in response to the first protector said determining to protection switch, protection switching by the first protector.

12. The method of claim 11, wherein the first protector said determines to protection switch and not to notify the second protector to protection switch.

13. The method of claim 10, wherein said operations include: in response to the first protector said determining to notify the second protector to protection switch: the first protector notifying the second protector of the particular condition of interest; and protection switching by the second protector in response to said notification by the first protector of the condition of interest.

14. The method of claim 13, wherein the first protector said determines to notify the second protector to protection switch, and not to protection switch itself.

15. A method, comprising:
performing operations by a device;
wherein the device includes: a detector, a first protector, and a second protector;
wherein said operations include:
the first protector registering with the detector to be notified of a particular condition of interest; wherein the particular condition of interest is a network, equipment or facility failure or degradation;
the detector detecting the particular condition of interest, and in response, notifying the first protector of the particular condition of interest;
the first protector receiving an indication of the particular condition of interest from the detector, and in response, identifying whether or not (a) to perform protection switching itself based on the particular condition of interest or (b) to notify the second protector of the particular condition of interest for the second protector to perform protection switching; and
the second protector receiving a notification of the particular condition of interest from the first protector, and in response, performing protection switching based on the particular condition of interest.

16. The method of claim 15, wherein said identifying whether or not (a) to perform protection switching itself based on the particular condition of interest or (b) to notify the second protector of the particular condition of interest for the second protector to perform protection switching includes: attempting by the first protector to protection switch, and in response to failure of said protection switch, to notify the second protector of the particular condition of interest.

17. The device of claim 15, wherein said identifying whether or not (a) to perform protection switching itself based on the particular condition of interest or (b) to notify the second protector of the particular condition of interest for the second protector to perform protection switching includes: referencing a data structure to identify whether or not a second particular condition of interest has been previously identified by the detector.

18. The method of claim 15, wherein said identifying whether or not (a) to perform protection switching itself based on the particular condition of interest or (b) to notify the second protector of the particular condition of interest for the second protector to perform protection switching includes: referencing a data structure to identify whether or not a second particular condition of interest has been previously identified by the detector; wherein the second particular condition of interest is a network, equipment or facility failure or degradation.

19. The method of claim 15, wherein said identifying whether or not (a) to perform protection switching itself based on the particular condition of interest or (b) to notify the second protector of the particular condition of interest for the second protector to perform protection switching is determined based on a fixed or programmed set of rules or user configuration commands.

20. The method of claim 15, wherein said operations include:
detecting, by the detector, a second particular condition of interest; wherein the second particular condition of interest is a network, equipment or facility failure or degradation; and
notifying, by the detector, the second protector of the second particular condition of interest.

21. The method of claim 20, wherein said operations include:
identifying by the second protector in response to receiving an indication of the second particular condition of interest from the detector, whether or not to (a) perform protection switching itself based on the second particular condition of interest or (b) to notify a third protector of the second particular condition of interest for the third protector to perform protection switching.

22. The method of claim 21, wherein said identifying whether or not to (a) perform protection switching itself based on the second particular condition of interest or (b) to notify the third protector of the second particular condition of interest is determined based on a fixed or programmed set of rules or user configuration commands.

23. The method of claim 15, wherein said operations include: the second protector registering with the first protector for notification of the particular condition of interest.

* * * * *